United States Patent
Washburn et al.

(10) Patent No.: US 7,307,949 B1
(45) Date of Patent: Dec. 11, 2007

(54) HIERARCHICAL POLICERS FOR ENFORCING DIFFERENTIATED TRAFFIC BEHAVIOR

(75) Inventors: James Washburn, Palo Alto, CA (US); Spencer Greene, Palo Alto, CA (US); Rami Rahim, Sunnyvale, CA (US); Stefan Dyckerhoff, Palo Alto, CA (US); Dennis C. Ferguson, Palo Alto, CA (US); Philippe Lacroute, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1030 days.

(21) Appl. No.: 10/298,552

(22) Filed: Nov. 19, 2002

(51) Int. Cl.
   *H04J 1/16* (2006.01)

(52) U.S. Cl. ...................................... 370/230; 370/411

(58) Field of Classification Search ................ 370/389, 370/229, 230, 235, 395.42, 395.5, 395.43, 370/252, 265, 290, 411, 487, 488, 490, 497
See application file for complete search history.

(56) References Cited

U.S. PATENT DOCUMENTS

2003/0035385 A1 * 2/2003 Walsh et al. ................ 370/316

* cited by examiner

*Primary Examiner*—Brenda Pham
(74) *Attorney, Agent, or Firm*—Harrity Snyder, LLP

(57) ABSTRACT

A hierarchical traffic policer may include a first policer configured to pass first packets when a first condition is met. The first policer also may alter selection information within the passed first packets. A second policer may be configured to pass second packets when a second condition is met. The second policer may be further configured to pass all of the passed first packets from the first policer based on the altered selection information within the passed first packets.

20 Claims, 6 Drawing Sheets

HIERARCHICAL POLICERS FOR ENFORCING DIFFERENTIATED TRAFFIC BEHAVIOR

BACKGROUND OF THE INVENTION

1. Field of the Invention

The invention relates generally to processing network traffic, and more particularly, to the policing of network traffic to confirm to a desired service.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing, these routers suffered performance degradation. In some instances, the routers failed to handle traffic at line rate when the new functionality was implemented.

To meet the new demands, purpose-built routers were designed with components optimized for routing. These routers not only handle higher line rates and higher network traffic volume, they also add functionality without compromising line rate performance.

A purpose-built router may include a number of input and output ports from which it transmits and receives information packets. A packet received at one port is typically directed to its appropriate output port based on an examination and processing of the packet's header information, which includes an indication of the packet's destination. A high-performance router must accordingly examine and process the information packets at a high speed.

It may be desirable to provide a certain level of service in a purpose-built router, for example using a policer, rather than a queue. FIG. 1 is a block diagram illustrating an exemplary token bucket policer 100. Policer 100 may include, conceptually, a token bucket 110 and a number of credits 120 in bucket 110. Those skilled in the art will appreciate that policer 100 may be implemented using software, hardware, or some combination of both.

In practice, policer 100 may be used to impose some level of service on entering packets, for example by rate limiting traffic. In such a case, a packet is passed through policer 100 if a sufficient number of credits 120 (e.g., proportional to a size of the packet) is present in bucket 110. If the sufficient number of credits 120 is present, this number of credits 120 is removed from bucket 110 when the packet is passed. If the sufficient number of credits 120 is not present, however, the packet may "fail" and may be dropped, marked as non-conforming, etc. More credits 120 may be periodically added to bucket 110 at a rate that corresponds to the overall bandwidth of policer 100. Further, the size of bucket 110 (i.e., an upper limit on the number of credits 120 that will fit in bucket 110, if applicable) may correspond to a maximum burst size allowed by policer 100.

Such a policer 100 may create a bandwidth-limited service, or other type of desired service, within a purpose-built router or other network device. When differentiated levels of service (e.g., high priority, low priority, premium, ordinary, etc.) are desired, however, such policers may have difficulty in properly handling different types of packets.

Thus, it is desirable to police network traffic to confirm to desired levels of service in high-performance routers and other network devices.

SUMMARY OF THE INVENTION

Systems and methods consistent with the principles of the invention, among other things, provide for improved policing of traffic with different levels of service.

In accordance with one purpose of the invention as embodied and broadly described herein, a hierarchical policer may include a sorter configured to separate data of a first type from data of a second type. A first policer may be configured to police the data of the first type from the sorter. A second policer may be configured to selectively police the data of the second type from the sorter and data of the first type from the first policer.

In another implementation consistent with the principles of the invention, a hierarchical traffic policer may include a first policer configured to pass first packets when a first condition is met. The first policer also may alter selection information within the passed first packets. A second policer may be configured to pass second packets when a second condition is met. The second policer may be further configured to pass all of the passed first packets from the first policer based on the altered selection information within the passed first packets.

In a further implementation consistent with the principles of the invention, a method for policing traffic may include separating high priority data and low priority data and determining a threshold amount of high priority credit based on a unit of high priority data. The unit of high priority data may be approved to produce a unit of approved data when a present amount of high priority credit exceeds the threshold amount of high priority credit. A threshold amount of low priority credit may be ascertained based on a unit of low priority data. The unit of low priority data may be allowed when a present amount of low priority credit exceeds the threshold amount of low priority credit. The unit of approved data may be passed without considering the present amount of low priority credit.

In yet another implementation consistent with the principles of the invention, a method for policing traffic may include setting meta-data in a plurality of packets of information and policing a first set of the packets of information. The meta-data in packets of the first set that passed the policing may be changed. A second set of the packets of information may be selectively policed based on the meta-data in the second set of packets.

In still a further implementation consistent with the principles of the invention, a network device for processing packets may include a buffer configured to store the packets, including header data and payload data for the packets. A packet routing component may be coupled to the buffer. The packet routing component may be configured to perform packet routing based on header data from the buffer. The packet routing component may include a first policer configured to pass first header data when a first condition is met and to alter selection information within the passed first packets. The packet routing component also may include a second policer configured to pass second header data when a second condition is met. The second policer may be further configured to pass all of the passed first header data from the first policer based on the altered selection information within the passed first header data.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, a hierarchical policer may include at least two policers that either normally police traffic or pass the traffic without policing based on certain data within the traffic. The certain data may be changed after normal policing.

System Configuration

Figure 2:
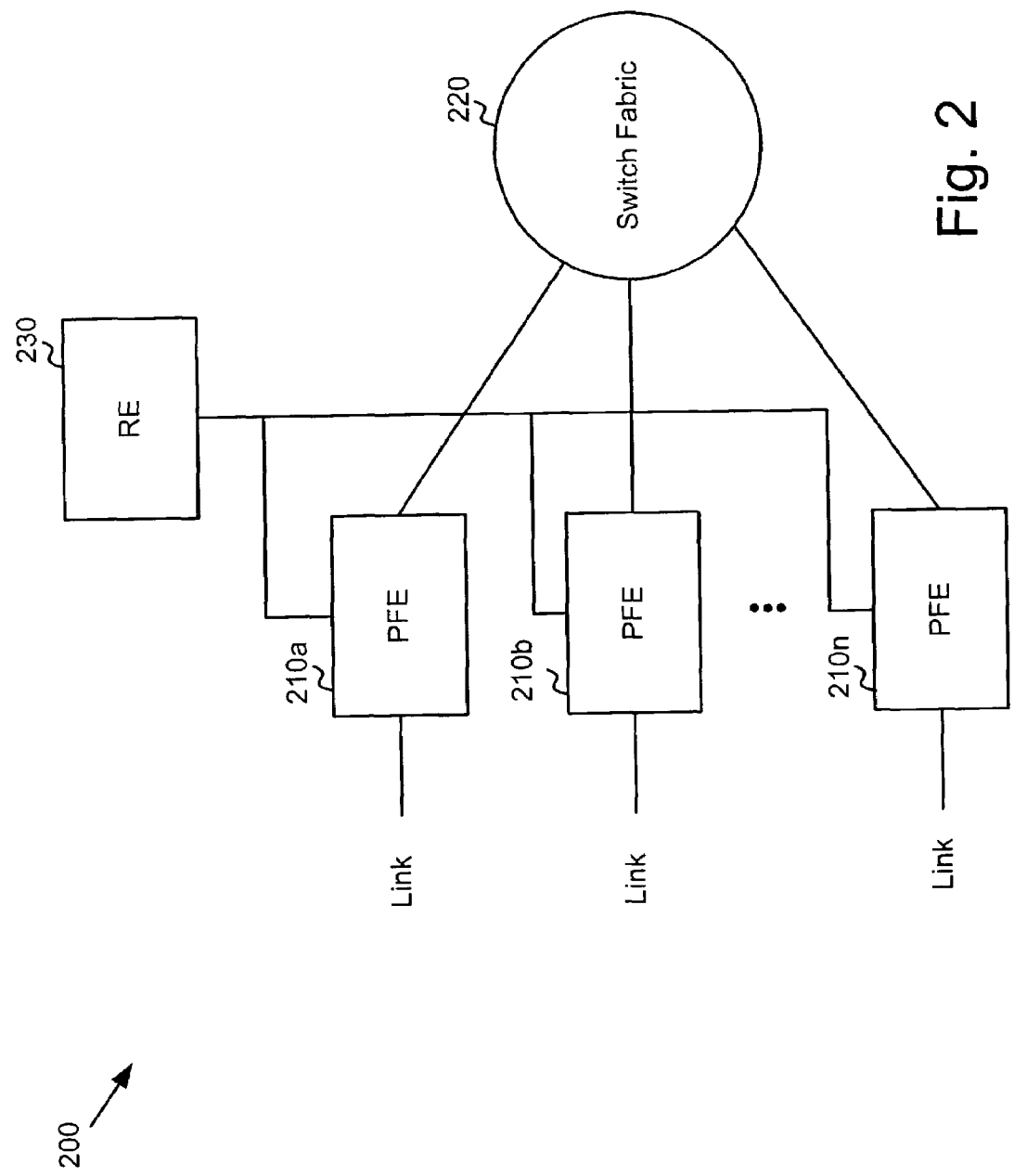
FIG. 2 is a block diagram illustrating an exemplary routing system in which principles consistent with the invention may be implemented.

FIG. 2 is a block diagram illustrating an exemplary routing system 200 in which the present invention may be implemented. System 200 receives a data stream from a physical link, processes the data stream to determine destination information, and transmits the data stream out on a link in accordance with the destination information. System 200 may include packet forwarding engines (PFEs) 210a, 210b, . . . , 210n (collectively, 210), a switch fabric 220, and a routing engine (RE) 230.

RE 230 performs high level management functions for system 200. For example, RE 230 communicates with other networks and systems connected to system 200 to exchange information regarding network topology. RE 230 creates routing tables based on network topology information, creates forwarding tables based on the routing tables, and forwards the forwarding tables to PFEs 210. PFEs 210 use the forwarding tables to perform route lookup for incoming packets. RE 230 also performs other general control and monitoring functions for system 200.

PFEs 210 are each connected to RE 230 and switch fabric 220. PFEs 210 receive data at ports on physical links connected to a network, such as a wide area network (WAN), a local area network (LAN), or a device. Each physical link could be one of many types of transport media, such as optical fiber or Ethernet cable. The data on the physical link is formatted according to one of several protocols, such as the synchronous optical network (SONET) standard or Ethernet.

PFEs 210 process incoming data by stripping off the data link layer. PFEs 210 convert header information from the remaining data into data structures referred to herein as "notifications" and "cells" (where a cell may be a fixed length data unit). For example, in one embodiment, the data remaining after the data link layer is stripped off is packet data. PFEs 210 include the layer 2 (L2) and layer 3 (L3) packet header information, some control information regarding the packets, and the packet data in a series of cells called "D" cells. In one embodiment, the L2, L3, and the control information are stored in the first two cells of the series of cells.

In general, L2 header information refers to header information used to steer packets within LANs. L3 header information, in contrast, provides connectivity between different LANs. In this sense, the L3 header information provides higher level destination information than the L2 header. An incoming packet may include both L2 and L3 header information. Router 200 may modify the packet's L2 and L3 header information before transmitting the packet to its next destination.

PFEs 210 form a notification based on the L2, L3, and control information, and performs a route lookup using the notification and the routing table from RE 230 to determine destination information. PFEs 210 may also further process the notification to perform protocol-specific functions, policing, and accounting, and might even modify the notification to form a new notification.

If the determined destination indicates that the packet should be sent out on a physical link connected to a particular one of PFEs 210, then the PFE retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 220, then the PFE retrieves the cells for the packet, modifies the first two cells with the new notification and new control information, if necessary, and sends the cells to the other PFE via switch fabric 220. Before transmitting the cells over switch fabric 220, PFEs 210 append a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one embodiment, RE 230, PFEs 210, and switch fabric 220 perform routing based on packet-level processing. PFEs 210 store each packet in cells while performing a route lookup using a notification, which is based on packet header information, including L2 and L3 layer header information. A packet might be received on one PFE and go back out to the network on the same PFE, or be sent through switch fabric 220 to be sent out to the network on a different PFE.

Figure 3:
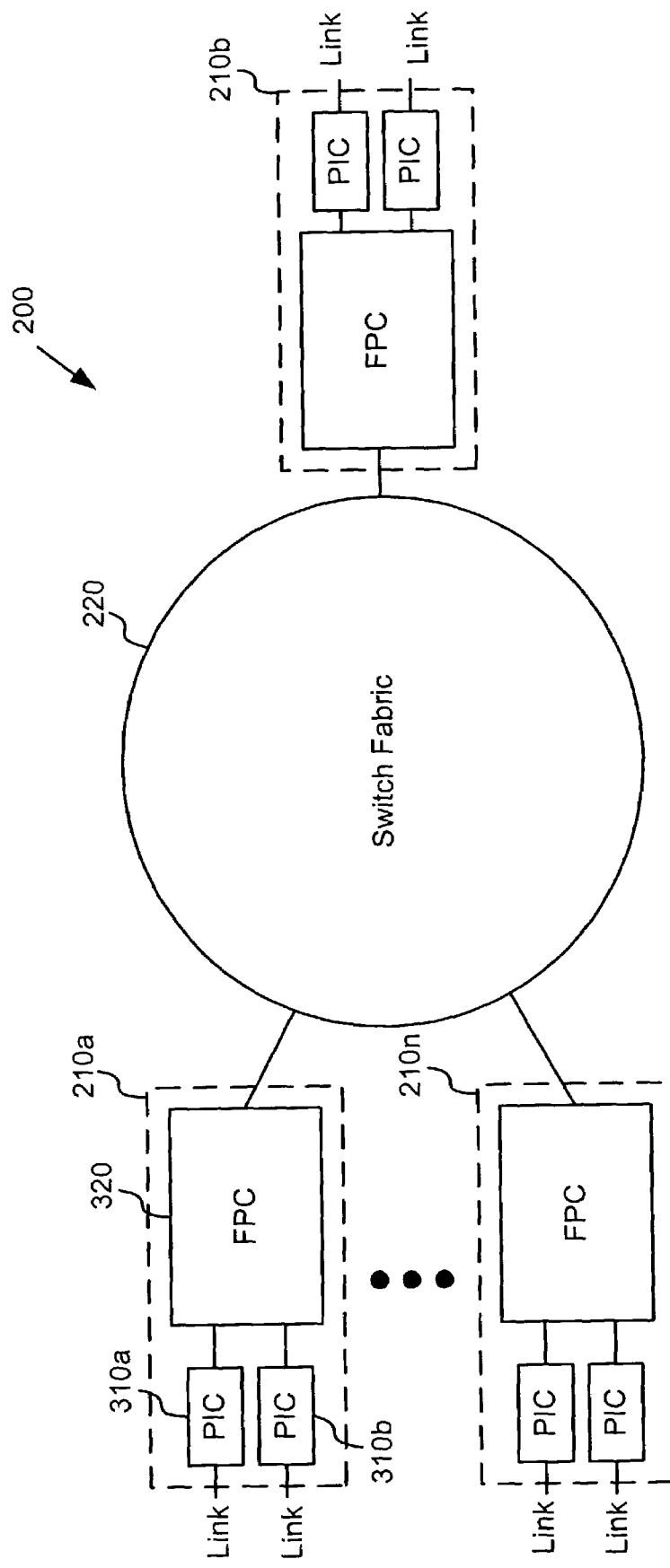
FIG. 3 is an exemplary detailed block diagram illustrating portions of the routing system shown in FIG. 2.

FIG. 3 is an exemplary detailed block diagram illustrating portions of routing system 200. PFEs 210 connect to one another through switch fabric 220. Each of the PFEs may include one or more physical interface cards (PICs) 310a, 310b (collectively, 310) and a flexible port concentrators (FPC) 320.

Each of PICs 310 may transmit data between a physical link and FPC 320. Different PICs are designed to handle different types of physical links. For example, one of PICs 310 may be an interface for an optical link while another PIC may be an interface for an Ethernet link.

FPC 320 performs routing functions and handle packet transfers to and from PICs 310 and switch fabric 220. For each packet it handles, an FPC performs the previously-discussed route lookup function. Although FIG. 3 shows two PICs connected to FPC 320 and three FPCs connected to switch fabric 220, in other embodiments consistent with principles of the invention there can be more or fewer PICs 310 and FPCs.

Figure 4:
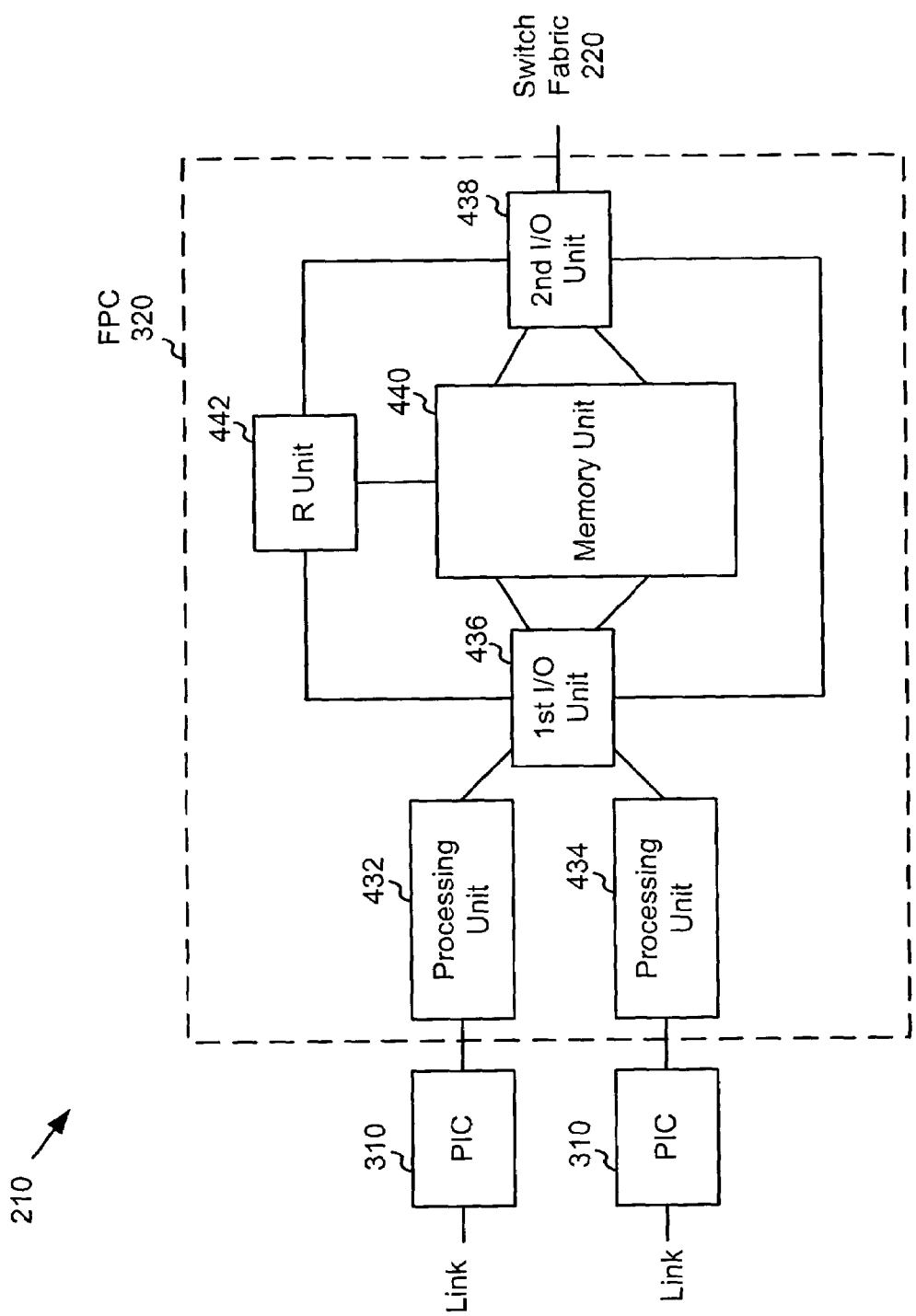
FIG. 4 is a diagram illustrating portions of FIG. 3 in additional detail.

FIG. 4 is an exemplary configuration of FPC 320 according to an implementation consistent with the principles of the invention. FPC 320 may include processing units 432 and 434, a first input/output (I/O) unit 436, a second I/O unit 438, a memory unit 440, and an R unit 442. Each processing unit 432 and 434 corresponds to one or more of PICs 310.

As will be described in greater detail below, processing units 432 and 434 may process packet data flowing between PICs 310 and first I/O unit 436. Each processing unit 432 and 434 may process packet data received from the PIC connected to it, and data received from first I/O unit 436.

For example, processing unit 432 or 434 may process packets from PICs 310 to convert the packets into data cells, and transmit the data cells to first I/O unit 436. Data cells are the data structure used by FPC 320 internally for transporting and storing data. In one implementation, data cells are 64 bytes in length.

In the other direction, processing unit 432 or 434 receives data cells and notifications from first I/O unit 436, extracts certain information and packet data from the data cells, and creates a packet based on the extracted information. Processing unit 432 or 434 creates the packet header based on the information extracted from the data cells. In one embodiment, processing unit 432 or 434 creates L2 and L3 header information based on the extracted information. The created L2 and L3 header information constitutes a new header that the packet uses as it is subsequently transmitted through the physical link.

R unit 442 may receive notifications from first I/O unit 436 and second I/O unit 438. R unit 442 may provide a variety of functions, such as route lookup, accounting, and policing functionality, based on the notifications. R unit 442 may receive one or more forwarding tables from RE 230 (FIG. 2) and use keys, forwarding table(s), and encapsulation tables to perform route or encapsulation lookups. R unit 442 may insert the lookup result into a notification, which it may store in memory unit 440.

Memory unit 440 may temporarily store data cells from first I/O unit 436 and second I/O unit 438 and notifications from R unit 442. Memory unit 440 may dispatch the notifications to first I/O unit 436 and second I/O unit 438. In response, first I/O unit 436 and second I/O unit 438 may use address information in the notification to read out data cells from memory unit 440 that correspond to a notification. The notification received from memory unit 440 may have been modified by R unit 442 with route or encapsulation lookup results. First I/O unit 436 and second I/O unit 438 may update the data cells read out of memory unit 440 with information from the modified notification. The data cells, which now include information from the modified notification, are sent to processing unit 432, processing unit 434, or switch fabric 220, depending on which of first I/O unit 436 or second I/O unit 438 is processing the notification.

Exemplary Traffic Policer

A hierarchical policer consistent with the principles of the invention herein may be used in system 200 described above, but could be used in any device (e.g., a network device) that polices traffic. For example, a policer consistent with the principles of the invention may be used at the ingress of system 200 (e.g., processing unit 432 or 434) and/or in the route lookup part of the system 200 (e.g., R unit 442). It may be used, however, anywhere in the path through a router or network device. The policer described herein may police packets or items representing packets, such as notifications.

One service example, in which context a policer consistent with the principles of the invention will be discussed, involves differentiation between "premium" traffic (e.g., high priority) and "ordinary" traffic (e.g., low priority). For the sake of discussion, suppose that one wishes to admit 1 Mbps of total traffic into a network (with 100 kb maximum burst size), and that within the total traffic, up to 200 kbps may be premium traffic (with 20 kb maximum burst size). Further, if the total traffic exceeds 1 Mbps, only the ordinary traffic should be dropped. The following exemplary traffic policer and its operation will be discussed in the context of this dual-priority example. It should be noted, however, that the principles of the invention are applicable to any number of differentiated traffic service levels.

Figure 5:
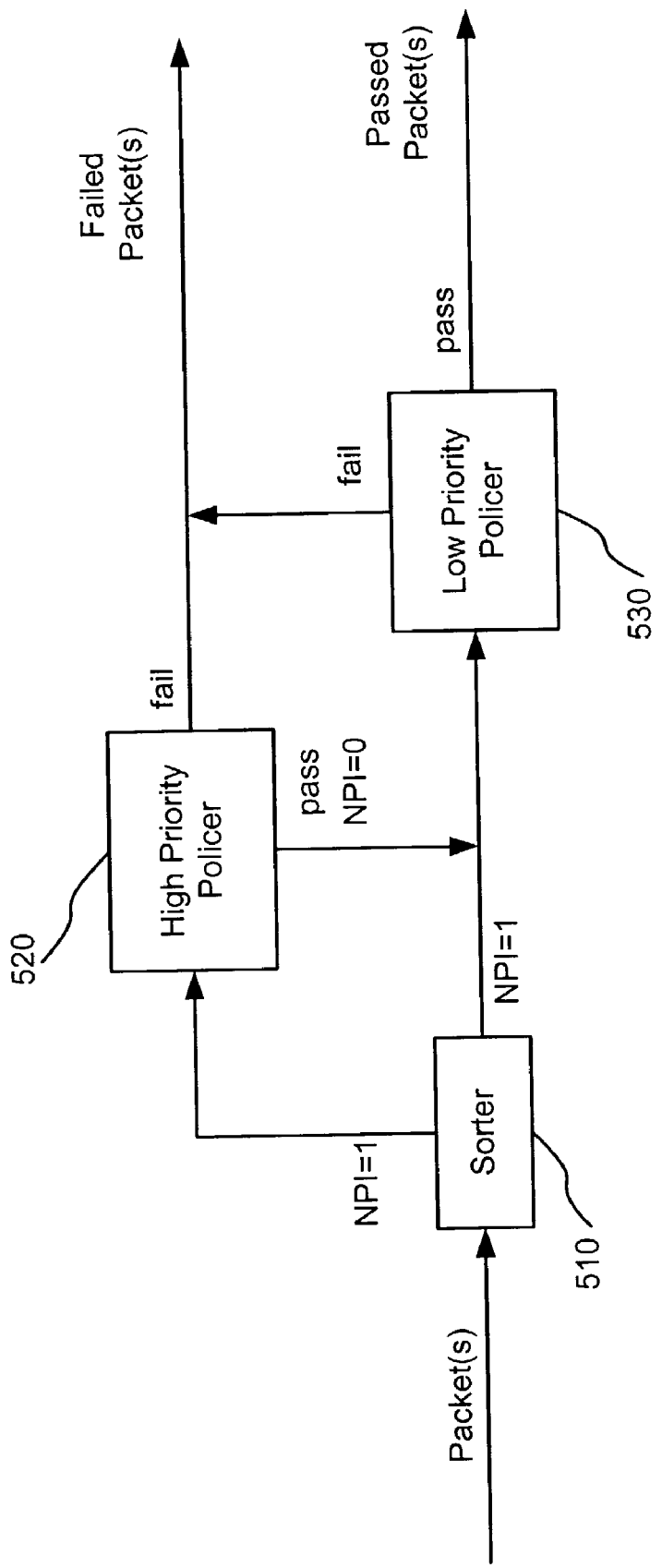
FIG. 5 is a diagram illustrating a policer consistent with the principles of the invention.

FIG. 5 is a diagram illustrating a hierarchical policer 500 consistent with the principles of the invention. Policer 500 may include a sorter 510, a high priority policer 520, and a low priority policer 530. Policer 500 and its components may be implemented in logic, a general purpose processor, a special purpose processor, or some combination thereof.

Sorter 510 may sort premium traffic from ordinary traffic, and route packets of each type accordingly. Although policer 500 will be described in terms of processing packets, it should be understood that in another embodiment policer 500 processes data (e.g., notifications) associated with respective packets. Sorter 510 also may be configured to set one or more bits of meta-data (i.e., data about the data in the packet) in each packet, called the Normal Policer Instruction (NPI), to a common value. The NPI may be referred to generically as "selection information" or a "flag" in the packet. With their respective NPIs set (e.g., to logical "1"), sorter 500 may be configured to send premium packets to the high priority policer 520 and ordinary packets to the low priority policer 530. Sorter 510 need not set the NPI value; it may already be set by default when the header information is created.

Figure 1:
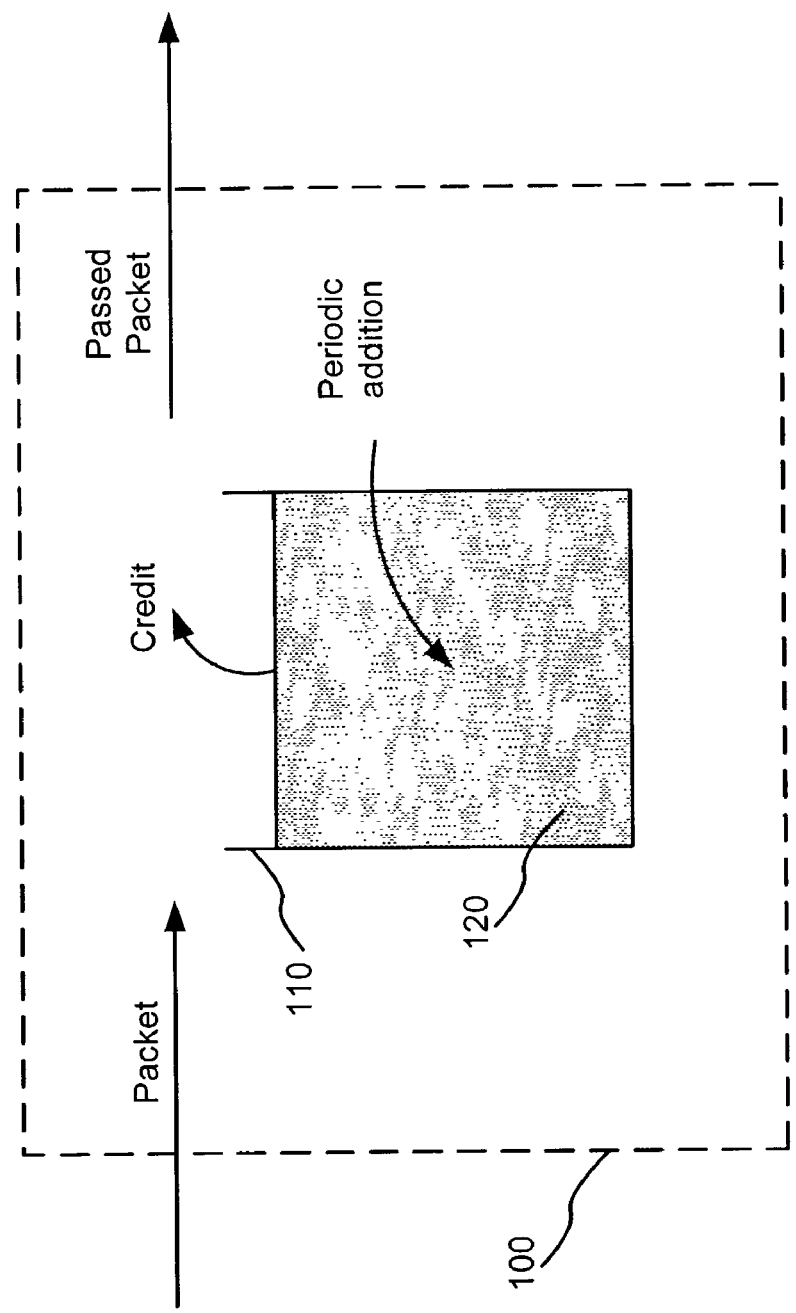
FIG. 1 is a block diagram conceptually illustrating a token bucket policer.

High priority policer 520 may be configured to perform "normal" token bucket-type policing on premium packets, based on their NPI value of 1. That is, high priority policer 520 may be configured to pass on any premium packets that conform to its bandwidth/burst rate requirements (e.g., 200 kbps and 20 kb) to the low priority policer 530 and fail any packets that do not. High priority policer 520 may implement an appropriate bucket size, credit add rate, and proportional credit removal, as explained above with respect to FIG. 1. For example, its "bucket" may be a value in memory or a register that is adjusted upward and downward as appropriate. Failed premium packets may be dropped or marked as non-conforming, possibly in conjunction with other processing such as counting the number of such packets.

High priority policer 520 also may be configured to change (i.e., reset/toggle/clear) the NPI to a different value (e.g., logical "0") for premium packets that it passes on to the low priority policer 530.

Low priority policer 530 may be configured to perform "normal" token bucket-type policing on ordinary packets, based on their NPI value of 1. That is, low priority policer 530 may be configured to pass on any ordinary packets that conform to its bandwidth/burst rate requirements (e.g., 1 Mbps and 100 kb) and fail any ordinary packets that do not.

Low priority policer 530 may implement an appropriate bucket size, credit add rate, and proportional credit removal, as explained above with respect to FIG. 1. Failed ordinary packets also may be dropped or marked as non-conforming, possibly in conjunction with other processing.

Low priority policer 530, however, may be configured to "protect" premium packets from the high priority policer 520 based on their NPI value of 0. When the low priority policer 530 detects a "0" NPI bit, it may not perform "normal" policing. Rather, the low priority policer 530 may be configured to pass on the premium packets and remove an associated number of credits. In this manner, hierarchical policer 500 may ensure that the total traffic stays within bandwidth and burst size limits (e.g., 1 Mbps and 100 kb), while protecting premium packets by only dropping ordinary packets when these limits are exceeded.

Operation of Exemplary Policer

Figure 6:
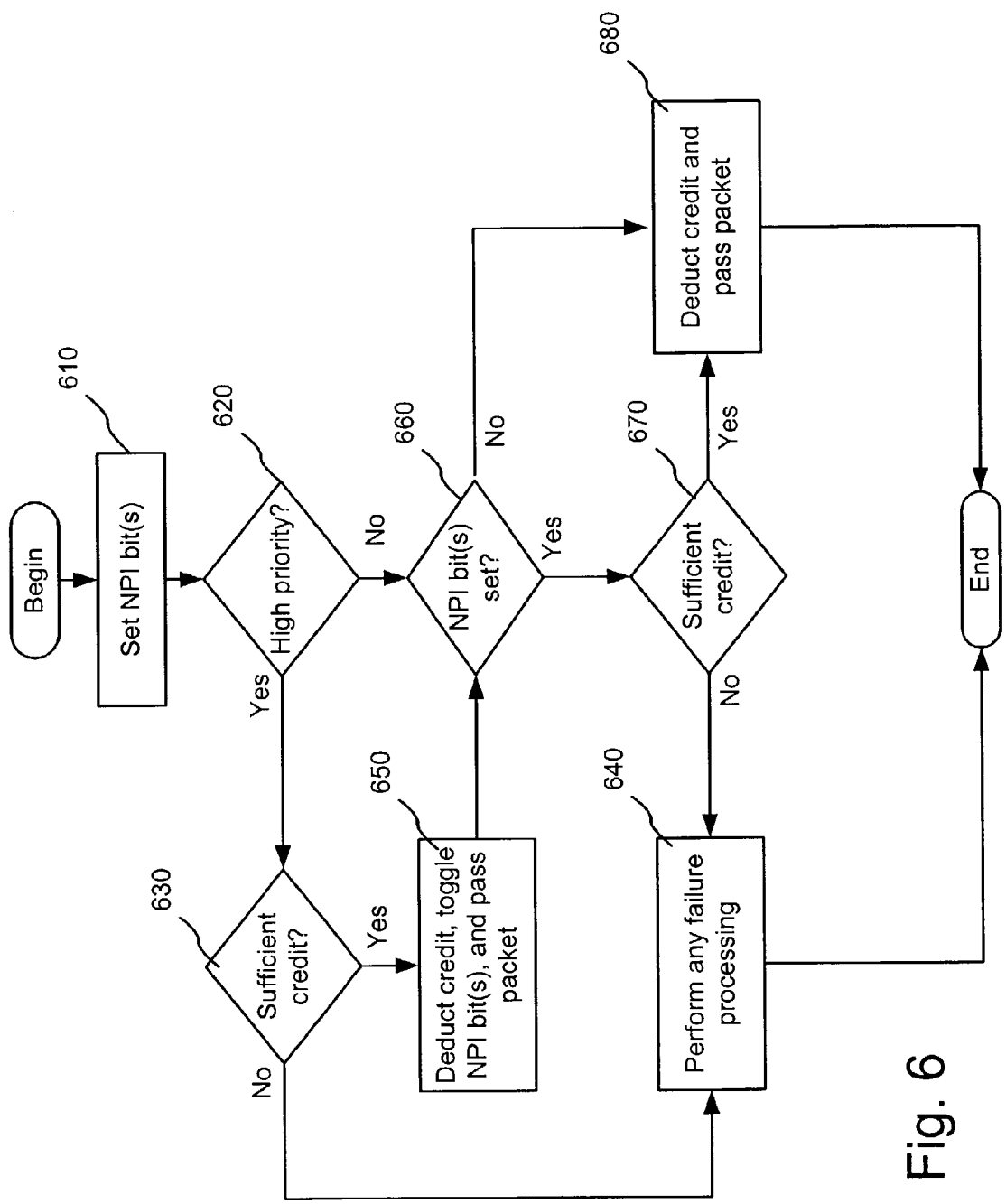
FIG. 6 is a flow chart illustrating operation of the policer of FIG. 5 consistent with the principles of the invention.

FIG. 6 is a flow chart illustrating operation of hierarchical policer 500 consistent with the principles of the invention. To begin, sorter 510 may set one or more NPI bits (e.g., to "1") in a received packet [act 610]. Although FIG. 5 only shows one NPI bit, if sorter 510 has more than two levels of service, additional NPI bits may be used. Alternately, a single NPI bit may be used if the sorter 510 has a sequentially cascading design. Sorter 510 may also determine whether the packet is premium (i.e., high priority) or ordinary (i.e., low priority) and send it to an appropriate policer 520/530 [act 620].

If the packet is associated with a premium level of service, the high priority policer 520 may determine whether sufficient credit exists in its bucket to pass the packet [act 630]. If not, high priority policer 520 may drop the premium packet, because it exceeded the premium bandwidth and/or burst size constraints [act 640]. High priority policer 520 may also collect counts or other statistics on the dropped (or otherwise failed) packets.

If sufficient credit exists in the bucket of high priority policer 520, credit proportional to the size of the premium packet may be removed, the NPI bit(s) may be changed (e.g., from "1" to "0"), and the premium packet may be passed to low priority policer 530 [act 650].

Low priority policer 530 may check the state of the NPI bit(s) of an incoming packet to determine whether to perform normal policing or not [act 660]. If the NPI bit(s) are set (i.e., the packet is an ordinary packet), low priority policer 530 may begin normal policing and determine whether sufficient credit exists in its bucket to pass the packet [act 670]. If sufficient credit does not exist, low priority policer 530 may drop the packet, because it exceeded the total bandwidth and/or burst size constraints [act 640].

If sufficient credit exists for the packet with the set NPI bit(s), the low priority policer 530 may remove a proportional amount of credit from its bucket, and pass the packet to another element for further processing [act 680]. Because act 670 determined that sufficient credit was present, the bucket in the low priority policer 530 may be left with zero or more credits after the packet is passed on.

If the NPI bit(s) are determined not to be set (e.g., have a value of "0") in act 660 (i.e., the packet is a premium packet in the example of FIG. 5), the low priority policer 530 still may remove a proportional amount of credit from its bucket, and pass the premium packet to another element for further processing [act 680]. Because act 670 is not performed for such packets with NPI=0, the low priority policer 530 does not really "police" such packets, and its operation is "modified" for the packets with NPI=0. In other words, if the packet has already been passed by a policer (e.g., 520), a subsequent policer may update the credit but not mark or drop the packet. In such a case, the bucket in the low priority policer 530 may start with zero or a small number of credits (because credits may not have been added since removal due to a previous packet), and the premium packet may cause the credits in the bucket of the low priority policer 530 to "go negative" (e.g., become a negative number).

With a "negative" number of credits, the low priority policer 530 will drop ordinary packets, but not premium packets, until its number of credits is sufficiently replenished. One alternative to using a negative value is to relax the maximum burst size (i.e., increase the bucket size) when NPI=0. For example, a maximum burst of 120 kb may be allowed when the packet is a premium packet. Another alternative to using a negative value would be to tighten the maximum burst size (i.e., decrease the bucket size) when NPI=0. For example, a maximum burst of 80 kb may be allowed when the packet is an ordinary packet. Either of these two schemes would allow a 20 kb premium packet to immediately follow a large ordinary packet without incurring a negative credit.

Note that the high priority policer 520 (or more generally an earlier policer than the last policer) may also check the NPI bit(s) to determine whether to perform normal policing in other implementations. In FIG. 5, however, there are no elements available before the high priority policer 520 to toggle the NPI bit(s) for premium packets, so the high priority policer 520 performs normal policing every time. If the NPI bit(s) are reset/modified (e.g., to "0") in a packet by an earlier policer, however, all subsequent policers may perform "modified" processing on the packet, because the NPI bit(s), once reset, may remain so. Hence, the high priority policer 520 may be referred to more generically as an example of a "normal" policer, and the low priority policer 530 (and any subsequent policers) may be referred to more generically as an example of a "modified" policer which may perform normal policing or modified processing on a packet based on its NPI bit(s).

Software Implementation of Exemplary Policer

A hierarchical policer consistent with the principles of the invention may also be implemented via software, for example as a set of general instructions performed by a processor or one or more specific instructions performed by a special purpose processor. These instructions may be stored on a computer-readable medium, such as magnetic media, optical media, non-volatile memory (e.g., ROM), volatile memory (e.g., RAM), etc.

The overall policing described above may be performed using two exemplary software instructions, presented below in pseudo-code. The first, "normal policer" instruction is:
normal policer (bucket):
    if (credit_avail≧packet_length) then
    credit_avail=credit_avail−packet_length;
    pass;
    else
    fail.

This normal policer instruction determines whether the length of a packet is greater than or equal to the credit available in a bucket (e.g., a number in a register). If so, the normal policer instruction subtracts credit proportional to the packet length from the credit available and passes the packet. If not, the normal policer instruction fails (e.g., drops) the packet. Although not explicitly shown, an associated "bucket" function may also track and update the credit available number according to predetermined service information (e.g., bandwidth and maximum burst size).

The second, "policer update" instruction is:

policer update (bucket):
    credit_avail=credit_avail−packet_length;
    pass.

This policer update instruction determines subtracts credit proportional to the packet length from the credit available and passes the packet, regardless of the amount of credit available. As with the normal policer instruction, an associated "bucket" function may also track and update the credit available number according to predetermined service information (e.g., bandwidth and maximum burst size).

Using these two instructions, the policing described in FIGS. 5 and 6 may be implemented in software as follows:

hierarchical policing ( ):
    if (packet=premium) then
    normal policer (high priority bucket);
    if (pass) then
        policer update (low priority bucket);
    else
    normal policer (low priority bucket).

As described in greater detail above, if the packet is a premium (e.g., high priority) packet, it may be processed with the normal policer instruction and the "high priority bucket" parameters. In the example herein, the high priority bucket parameters correspond to 200 kbps bandwidth and 20 kb maximum burst size.

If the premium packet passes (e.g., and has its NPI bit changed), it may be processed with the policer update instruction and the "low priority bucket" parameters. In the example herein, the low priority bucket parameters correspond to 1 Mbps bandwidth and 100 kb maximum burst size. The size of the premium packet may cause the credits available in the low priority bucket to be totally depleted or become negative. The low priority bucket function may track "negative" credits until the periodic addition of credits replenishes the credits in the low priority bucket.

If the packet is not a premium packet (i.e., it is ordinary or some lower service level), it may be processed with the normal policer instruction and the "low priority bucket" parameters. If there are insufficient credits for the ordinary packet (e.g., due to credit depletion by a premium packet), the ordinary packet may be failed (e.g., dropped) by the normal policer instruction.

CONCLUSION

As described above, a hierarchical policer may include multiple policers that either normally police traffic or pass the traffic without policing based on meta-data within units of the traffic. The meta-data data may be changed to affect subsequent processing of a unit of traffic after normal policing of that unit.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIG. 6, the order of the acts may be different in other implementations consistent with principles of the invention. Additionally, lines with arrows are used in the figures to generally illustrate the flow of data. In practice, embodiments consistent with the principles of the invention may send data on these lines in both directions.

Further, it is specifically contemplated that the principles of the invention may be extended to hierarchical policers beyond the two-level policer described herein. Three or more levels of service may be implemented by a given configuration of policers, with some of the services sharing bandwidth and possibly other services not sharing bandwidth. Those skilled in the art will appreciate various parallel and serial configurations of policers (e.g., 520, 530) needed to implement differentiation between an arbitrary number of related service levels. Also, although token-bucket policers have been described, it is specifically envisioned that any other type of policer may be used in accordance with the principles of the invention.

Also, although traffic differentiation based bandwidth has been discussed, traffic policing may be performed using other characteristics of the traffic, such as various conforming flags, traffic origin, traffic protocol, etc. It should also be understood that within the bandwidth-limited example herein, the specific bandwidth and burst size numbers used are purely exemplary.

PFEs 210 may be implemented in hardware, software, or some combination thereof. For example, various portions of PFEs 210 may be implemented in application-specific integrated circuits (ASICs). The ASICs may be configured to perform some processing via dedicated logic, and may also be configured to perform some processing using microcode instructions that may be stored in memory. Those skilled in the router art will appreciate that the invention described herein might be practiced using a variety of hardware configurations in addition to, or instead of, ASICs. For example, some combination of general purpose processors, digital signal processors (DSPs), and programmable gate arrays (PGAs) may also be utilized to implement the functionality described herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A hierarchical traffic policer comprising:
    a traffic sorter to separate packets of a first type from packets of a second type;
    a first policer to police the packets of the first type from the traffic sorter; and
    a second policer to selectively police the packets of the second type from the traffic sorter and packets of the first type from the first policer, the first policer passes packets of the first type that meet a first criteria to the second policer and fails packets of the first type that do not meet the first criteria.

2. The hierarchical traffic policer of claim 1, wherein the second policer passes packets of the first type received from the first policer.

3. The hierarchical traffic policer of claim 2, wherein the second policer passes packets of the second type that meet a second criteria and fails packets of the second type that do not meet the second criteria.

4. The hierarchical traffic policer of claim 1, wherein the traffic sorter sets a flag in the packets of a first type and in the packets of a second type,
   wherein the first policer clears the flag in the packets of the first type that it passes, and
   wherein the second policer selectively polices the packets of the second type and the packets of the first type based on states of their respective flags.

5. The hierarchical traffic policer of claim 4, wherein the second policer polices packets whose flags are set and does not police packets whose flags are clear.

6. A hierarchical traffic policer comprising:
   a first policer to pass first packets when a first condition is met and alter selection information within the passed first packets, the first policer drops the first packets when the first condition is not met; and
   a second policer to pass second packets when a second condition is met, the second policer further passes the passed first packets from the first policer based on the altered selection information within the passed first packets, the second policer drops the second packets when the second condition is not met.

7. The hierarchical traffic policer of claim 6, wherein the first condition includes a number of credits in the first policer being greater than or equal to a size of one of the first packets in the first policer, and
   wherein the second condition includes a number of credits in the second policer being greater than or equal to a size of one of the second packets in the second policer.

8. The hierarchical traffic policer of claim 6, further comprising:
   a third policer to pass third packets when a third condition is met,
   wherein the second policer further alters selection information within the passed second packets, and
   wherein the third policer further passes all of the passed first packets from the first policer and all of the passed second packets from the second policer based on the altered selection information within the passed first packets and within the passed second packets.

9. A hierarchical traffic policer comprising:
   a first policer to pass first packets when a first condition is met and alter selection information within the passed first packets;
   a second policer to pass second packets when a second condition is met, the second policer further passes the passed first packets from the first policer based on the altered selection information within the passed first packets; and
   a sorter to send the first packets to the first policer and the second packets to the second policer, the sorter further setting selection information within the first packets and the second packets to a common value.

10. The hierarchical traffic policer of claim 9, wherein the first condition includes the selection information within the first packets being the common value.

11. The hierarchical traffic policer of claim 10, wherein the first condition further includes a number of credits in the first policer being greater than or equal to a size of one of the first packets in the first policer, and
   wherein the second condition further includes a number of credits in the second policer being greater than or equal to a size of one of the second packets in the second policer.

12. A method for policing traffic, comprising:
   separating high priority data and low priority data;
   determining a threshold amount of high priority credit based on a unit of high priority data;
   approving the unit of high priority data to produce a unit of approved data when a present amount of high priority credit exceeds the threshold amount of high priority credit;
   ascertaining a threshold amount of low priority credit based on a unit of low priority data;
   allowing the unit of low priority data when a present amount of low priority credit exceeds the threshold amount of low priority credit; and
   passing the unit of approved data without considering the present amount of low priority credit.

13. The method of claim 12, wherein the separating includes setting meta-data within the high priority data and the low priority data.

14. The method of claim 13, wherein the approving includes changing the meta-data within the unit of approved data.

15. The method of claim 14, wherein the passing includes passing the unit of approved data based on the changed meta-data within the unit of approved data.

16. The method of claim 12, wherein the threshold amount of high priority credit is proportional to a size of the unit of high priority data, and
   wherein the approving includes deducting the threshold amount of high priority credit from the present amount of high priority credit when of the unit of approved data is produced.

17. The method of claim 12, wherein the threshold amount of low priority credit is proportional to a size of the unit of low priority data, and
   wherein the allowing includes deducting the threshold amount of low priority credit from the present amount of low priority credit when of the unit of low priority data is allowed.

18. The method of claim 12, wherein the passing includes deducting an amount of low priority credit proportional to a size of the unit of approved data from the present amount of low priority credit.

19. The method of claim 12, further comprising:
   periodically increasing the present amount of high priority credit at a first rate; and
   periodically increasing the present amount of low priority credit at a second rate.

20. A network device for processing packets comprising:
   a buffer to store the packets, including header data and payload data for the packets;
   a packet routing component coupled to the buffer, the packet routing component to perform packet routing based on header data from the buffer, the packet routing component including:
      a first policer to pass first header data when a first condition is met and to alter selection information within the passed first packets; and
      a second policer to pass second header data when a second condition is met, the second policer further passes the passed first header data from the first policer based on the altered selection information within the passed first header data, the packet routing component drops packets from the buffer whose header data does not pass the first policer or the second policer.

* * * * *